(12) United States Patent
Himmelmann

(10) Patent No.: US 7,956,565 B2
(45) Date of Patent: Jun. 7, 2011

(54) VARIABLE FIELD PERMANENT MAGNET DYNAMOELECTRIC MACHINE

(75) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 397 days.

(21) Appl. No.: 12/182,296

(22) Filed: Jul. 30, 2008

(65) Prior Publication Data

US 2010/0026228 A1 Feb. 4, 2010

(51) Int. Cl.
*H02K 1/00* (2006.01)
(52) U.S. Cl. .................. 318/538; 318/492; 318/376
(58) Field of Classification Search .................. 318/538, 318/492, 376, 400.21; 310/268, 80, 156.01
See application file for complete search history.

(56) References Cited

U.S. PATENT DOCUMENTS

| | | | |
|---|---|---|---|
| 2,025,187 A | 12/1935 | Werner et al. | |
| 4,809,122 A | 2/1989 | Fitzner | |
| 4,920,295 A | 4/1990 | Holden et al. | |
| 5,627,419 A | 5/1997 | Miller | |
| 5,752,380 A | 5/1998 | Bosley et al. | |
| 6,404,097 B1 | 6/2002 | Pullen | |
| 6,492,753 B2 | 12/2002 | Zepp et al. | |
| 6,555,941 B1 | 4/2003 | Zepp et al. | |
| 6,612,112 B2 | 9/2003 | Gilbreth et al. | |
| 6,639,328 B2 | 10/2003 | Wacknov | |
| 6,647,707 B2 | 11/2003 | Dev | |
| 6,657,332 B2 | 12/2003 | Balas | |
| 6,657,348 B2 | 12/2003 | Qin et al. | |
| 6,732,531 B2 | 5/2004 | Dickey | |
| 6,747,372 B2 | 6/2004 | Gilbreth et al. | |
| 6,748,742 B2 | 6/2004 | Rouse et al. | |
| 6,838,778 B1 | 1/2005 | Kandil et al. | |
| 6,838,779 B1 | 1/2005 | Kandil et al. | |
| 6,873,071 B2 | 3/2005 | Dooley | |
| 6,943,478 B2 | 9/2005 | Zepp et al. | |
| 6,988,357 B2 | 1/2006 | Dev | |
| 7,042,128 B2 | 5/2006 | Zepp et al. | |
| 7,140,240 B2 | 11/2006 | Gustafson et al. | |
| 7,190,101 B2 | 3/2007 | Hirzel | |
| 7,219,490 B2 | 5/2007 | Dev | |
| 7,226,277 B2 | 6/2007 | Dooley | |
| 7,268,522 B1 | 9/2007 | Baker | |
| 7,298,282 B2 | 11/2007 | Gustafson et al. | |
| 7,332,884 B2 | 2/2008 | Rozman et al. | |
| 7,352,090 B2 | 4/2008 | Gustafson et al. | |
| 7,385,332 B2 | 6/2008 | Himmelmann et al. | |
| 2005/0248227 A1* | 11/2005 | Yuan et al. ............... | 310/156.43 |

* cited by examiner

*Primary Examiner* — Karen Masih
(74) *Attorney, Agent, or Firm* — Carlson Gaskey & Olds P.C.

(57) ABSTRACT

A dynamoelectric machine which operates in a constant power mode.

18 Claims, 11 Drawing Sheets

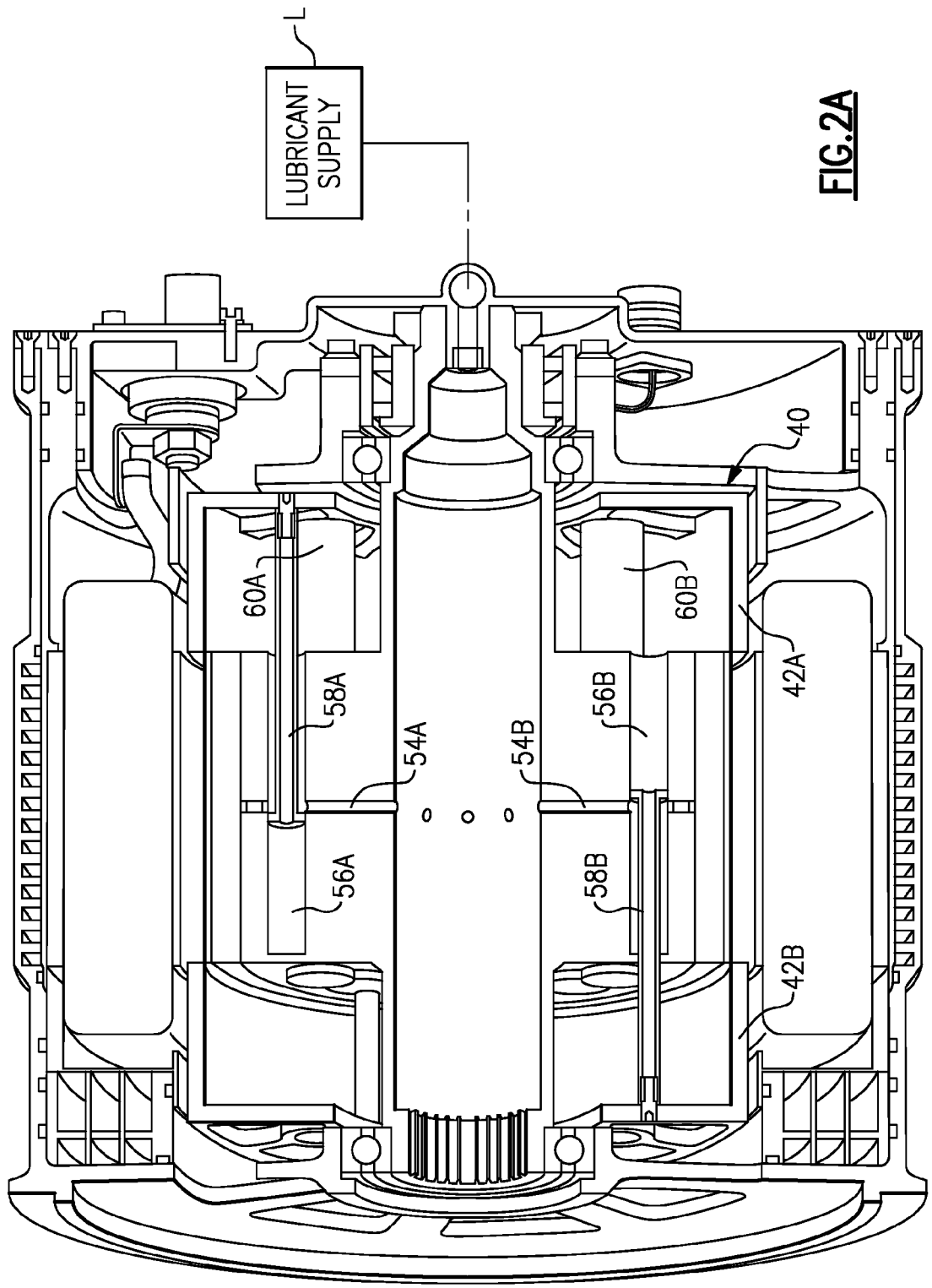

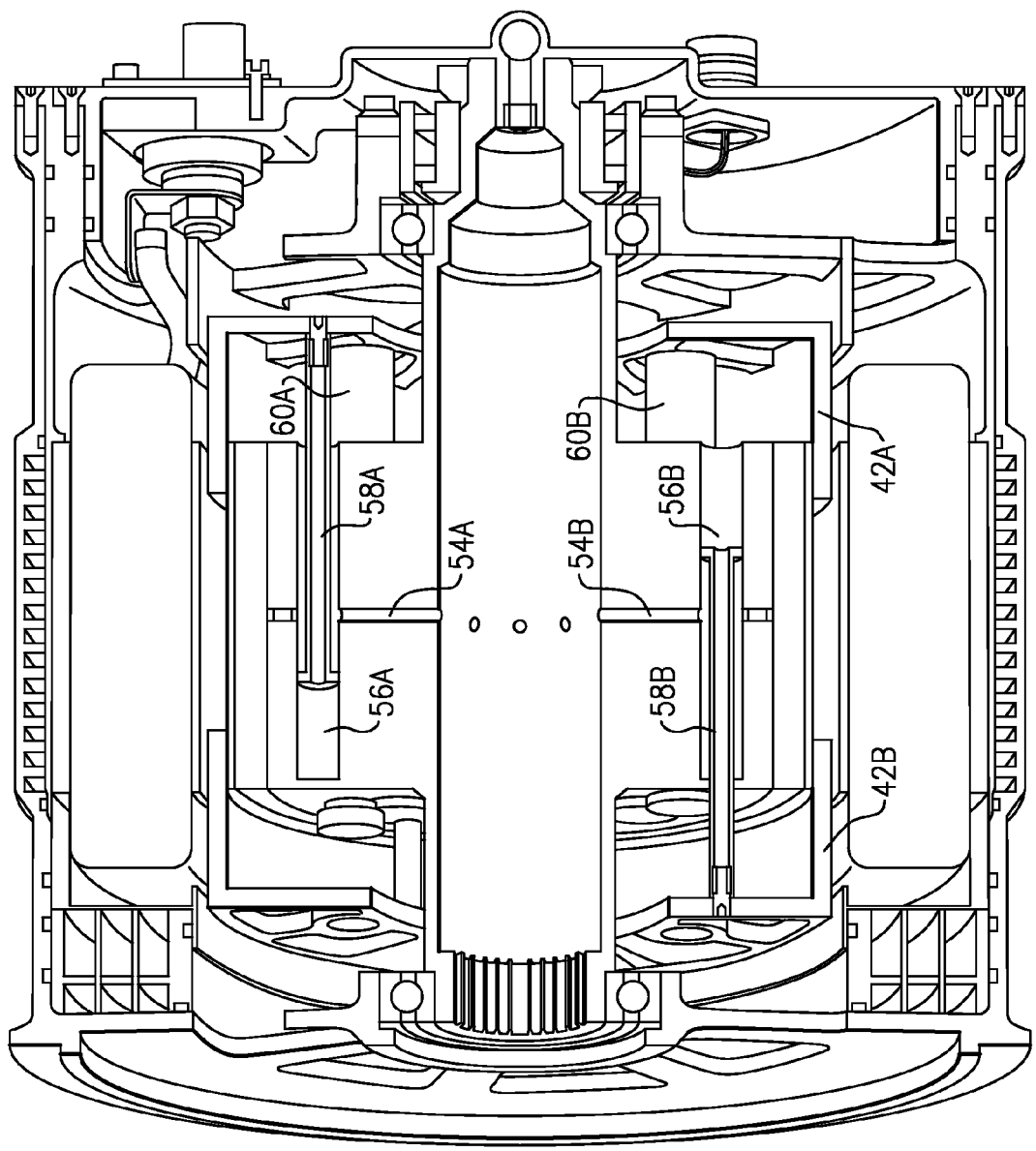

VARIABLE FIELD PERMANENT MAGNET DYNAMOELECTRIC MACHINE

BACKGROUND

The present application relates to a dynamoelectric machine, and more particularly to a permanent magnet dynamoelectric machine that has adjustable magnetic flux interaction.

Dynamoelectric machines of the permanent magnet type have a rotor assembly with a plurality of permanent rotor magnets that rotate with a drive shaft relative a stator assembly that includes a plurality of stator poles and a stator winding. The rotor magnets have a fixed axial alignment that generally coincides with the axial position of the stator poles. The rotor magnets have a fixed radial alignment inside the stator poles for machines of the conventional type or outside the radial position of the stator poles for machines of the "inside out" type.

Back electromotive force (EMF) is directly proportional to the motor speed, therefore, as the rotor speed increases, the back EMF will also increase. When the dynamoelectric machine is used as a motor, back EMF subtracts from the electrical potential of the power source. The power source must supply increasing electrical potential for increasing speed at constant torque. This rise in back EMF limits the current that can be forced through the windings, thereby limiting the motors output torque. Eventually, the power source cannot supply additional electrical potential and then the output torque of the dynamoelectric machine falls with increased speed until no further torque is achievable.

Dynamoelectric machines of the permanent magnet type used as a generator may produce a lower electrical potential than required when operated at a slower rotational speed than a desired operational speed and produce too much potential when operated at a faster rotational speed than the desired operational speed. Dynamoelectric machines of the permanent magnet type used as a motor may have poor torque characteristics at high speeds when the design requires high torque at low speeds.

SUMMARY

A dynamoelectric machine according to an exemplary aspect of the present invention includes a rotor assembly mounted relative a stator assembly for rotation about an axis of rotation and a flux throttle system selectively positionable between the stator assembly and the rotor assembly.

A dynamoelectric machine according to an exemplary aspect of the present invention includes a flux throttle system having a first ring and a second ring. A first and second piston which axially drives the first ring and the second ring axially outboard relative the stator assembly and the rotor assembly in response to a rotational speed of the rotor assembly. A first and second return spring mounted within the rotor assembly, the first and second return spring operable to axially bias the first ring and the second ring.

A method of operating a dynamoelectric machine in a constant power mode according to an exemplary aspect of the present invention includes axially positioning a flux throttle system relative a stator assembly and a rotor assembly in response to a rotational speed of the rotor assembly.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 2A is a sectional view of a dynamoelectric machine in a Stall Condition Low Speed mode;

FIG. 2B is a sectional view of a dynamoelectric machine in a Medium Speed-Low End mode;

DETAILED DESCRIPTION

Figure 1A:
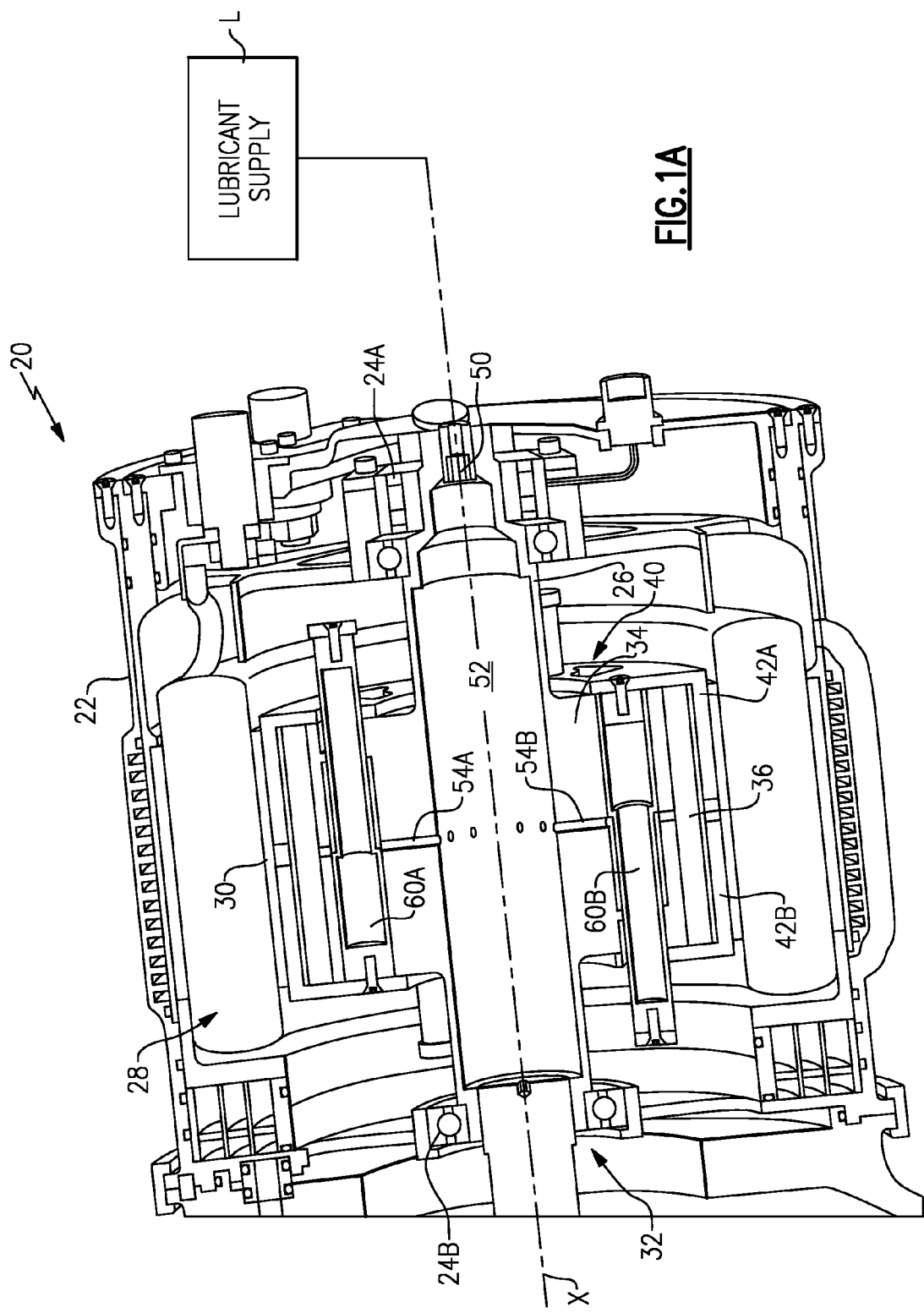
FIG. 1A is a sectional view of a dynamoelectric machine.

FIG. 1A schematically illustrates a permanent magnet type dynamoelectric machine 20. The dynamoelectric machine 20 includes a housing 22 that mounts a set of bearings 24A, 24B which supports a drive shaft 26 that rotates about an axis of rotation X. The permanent magnet type dynamoelectric machine 20 illustrated in the disclosed non-limiting embodiment is of the standard type. It should be understood that other types, such as "inside-out" types, may alternatively benefit herefrom.

The dynamoelectric machine 20 includes a stator assembly 28 which has a plurality of stator poles 30. Each stator pole 30 is of a generally cylindrical pattern which faces radially inward toward the axis of rotation X. It should be understood that other shapes, such as conical or stepped, may alternatively be utilized. A rotor assembly 32 is mounted to the drive shaft 26 adjacent and in general alignment with the stator assembly 28. The rotor assembly 32 includes a rotor hub 34 that mounts a plurality of permanent rotor magnets 36. The rotor magnets 36 face radially outward from the axis of rotation X toward the stator poles 30.

The dynamoelectric machine 20 further includes a flux throttle system 40. The flux throttle system 40, in one non-limiting embodiment, includes a first ring 42A and a second ring 42B which are movable between the stator assembly 28 and the rotor assembly 32. The first ring 42A and the second ring 42B are manufactured of a metallic material to rotate with the rotor assembly 32 and may be axially positioned along the axis of rotation X. It should be understood that a single ring of extended length may alternatively be utilized. The flux throttle system 40 controls the effective stack length of the dynamoelectric machine 20 through the axial insertion of the first ring 42A and the second ring 42B between the plurality of stator poles 30 and the plurality of permanent rotor magnets 36.

The dynamoelectric machine 20 includes a lubrication system L (illustrated schematically) which supplies a lubricant to the bearings 24A, 24B. The drive shaft 26 in one non limiting embodiment, includes a lubrication channel 50 that extends along the axis of rotation X. The lubrication channel 50 may receive lubricant from a lubricant system L which communicates lubricant into one end section of the drive shaft 26. The lubricant flows into an interior passage 52 of the drive shaft to lubricate the bearings 24A, 24B as well as other components.

Figure 2C:
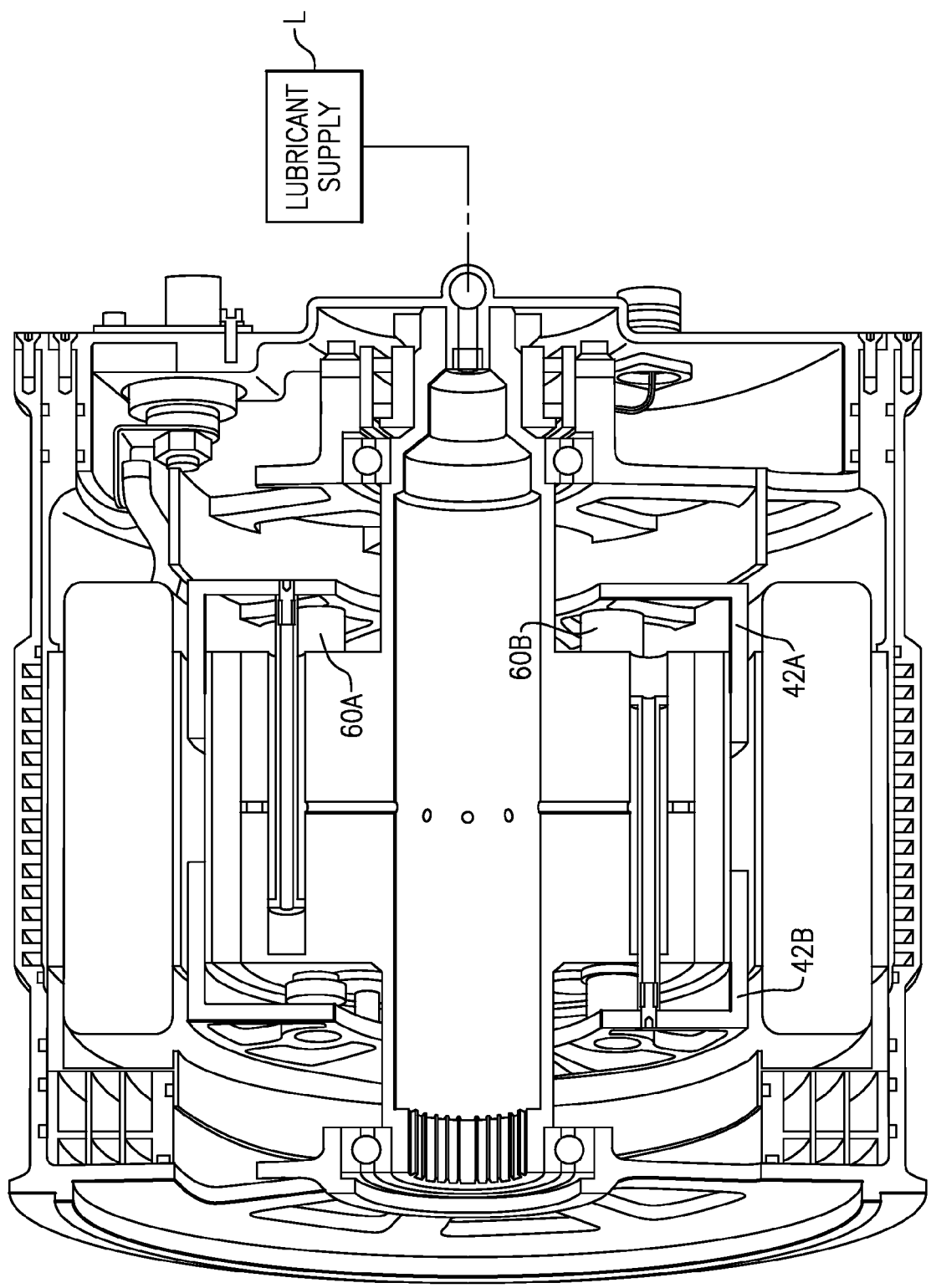
FIG. 2C is a sectional view of a dynamoelectric machine in a Medium Speed-High End mode.
Figure 2D:
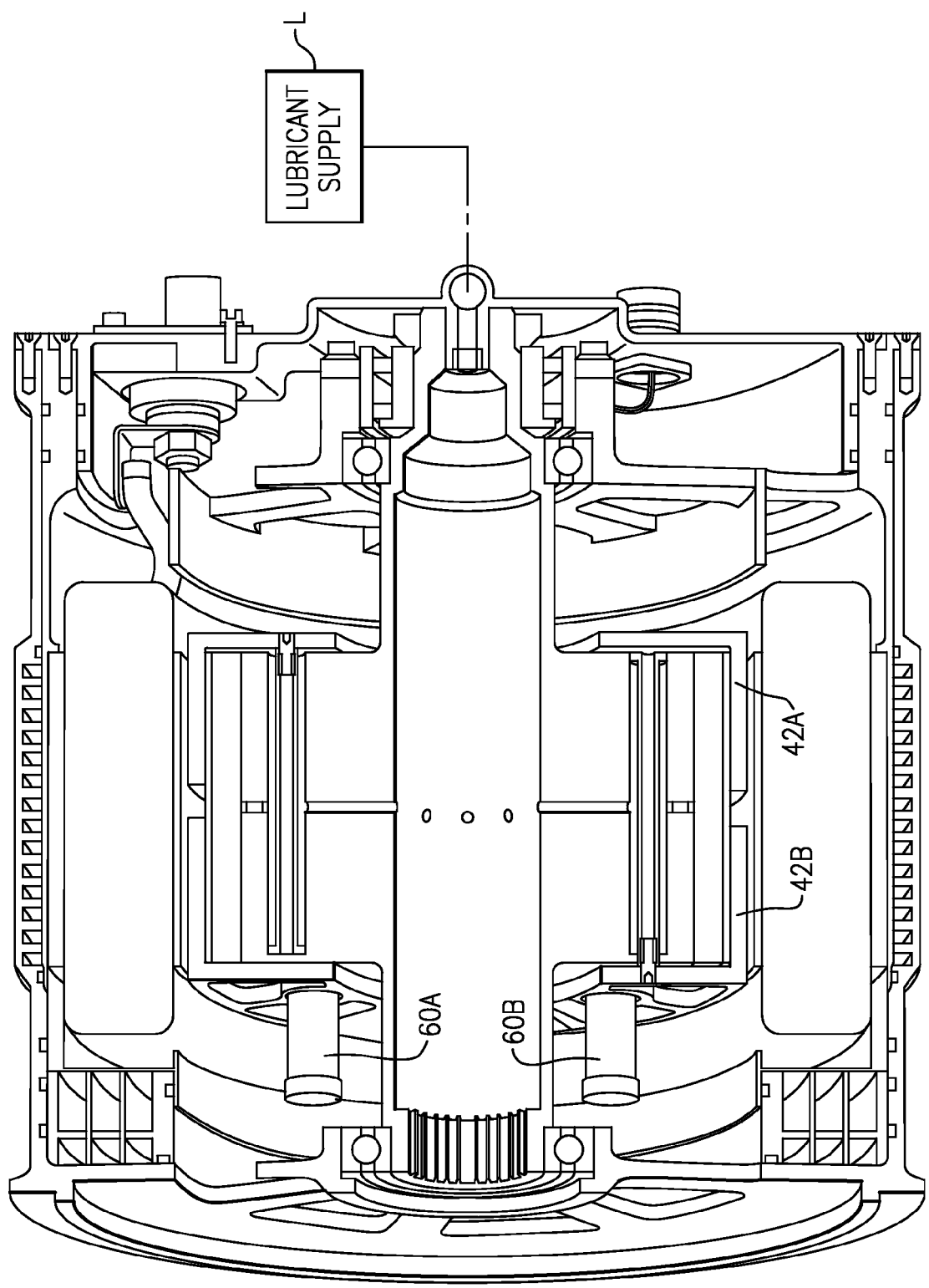
FIG. 2D is a sectional view of a dynamoelectric machine in a High speed End mode.

From the interior passage 52 of the drive shaft 26, a transverse passage 54A, 54B communicate with a piston chamber 56A, 56B formed in the rotor assembly 32 to drive respective pistons 58A, 58B. The piston chambers 56A, 56B and pistons 58A, 58B are arranged within the rotor hub 34, around the axis of rotation X and generally parallel thereto (FIG. 2A). It should be understood that the piston and spring system may alternatively be located external to the rotor assembly 32. Each piston 58A, 58B is connected to the respective first ring 42A and the second ring 42B to drive the respective first ring 42A and second ring 42B inboard toward each other. Although only a single piston chamber 56A, 56B and single respective piston 58A, 58B are illustrated for the respective first ring 42A and second ring 42B, it should be understood that any number may alternatively or additionally be provided to drive the first ring 42A and the second ring 42B from associated transverse passages.

Figure 1B:
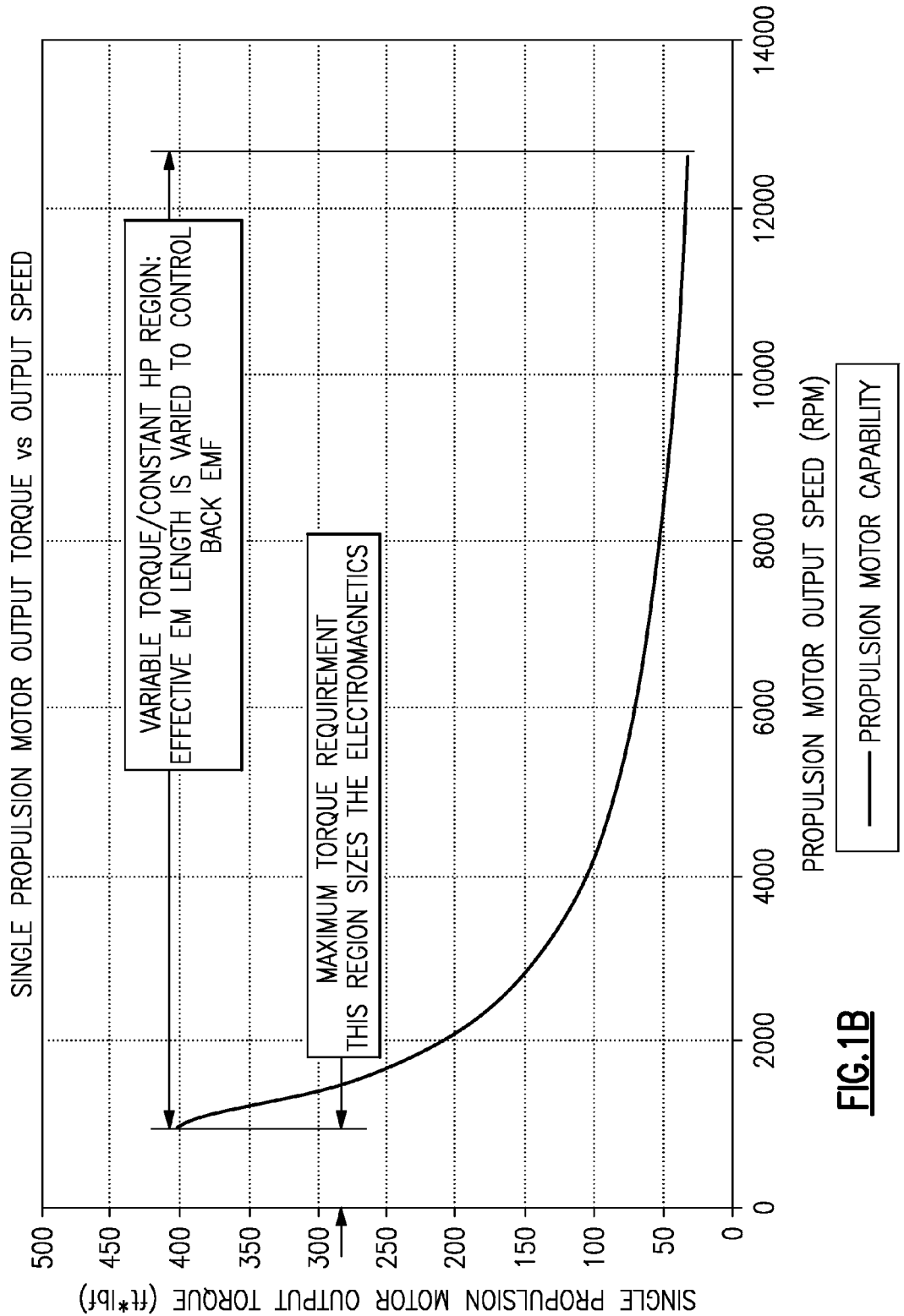
FIG. 1B is a graphical representation of output torque vs. output speed illustrating a maximum torque range and a variable torque/Constant HP range.

A return spring 60A, 60B is connected to the respective first ring 42A and the second ring 42B to spring bias the respective first ring 42A and second ring 42B outboard. That is, the return spring 60A, 60B provide an outboard bias to the respective first ring 42A and second ring 42B. The return springs 60A, 60B are mounted within the rotor hub 34, around the axis of rotation X and generally parallel thereto The back EMF of the dynamoelectric machine 20 is controlled by the axial length of the permanent rotor magnets 36 exposed to the stationary stator poles 30. By partially covering the permanent rotor magnets 36 with the first ring 42A and the second ring 42B, the magnetic flux fields from the permanent rotor magnets 36 are short circuited to adjacent permanent rotor magnets 36. With the magnetic flux field short circuited, the rotor flux cannot impinge on the stationary stator poles 30. This electrically removes the covered portions of the permanent rotor magnets 36 from the dynamoelectric machine 20. This effectively reduces the dynamoelectric machine 20 stack length which reduces the generation of back EMF (FIG. 1B).

Stall Condition Low Speed

Figure 3A:
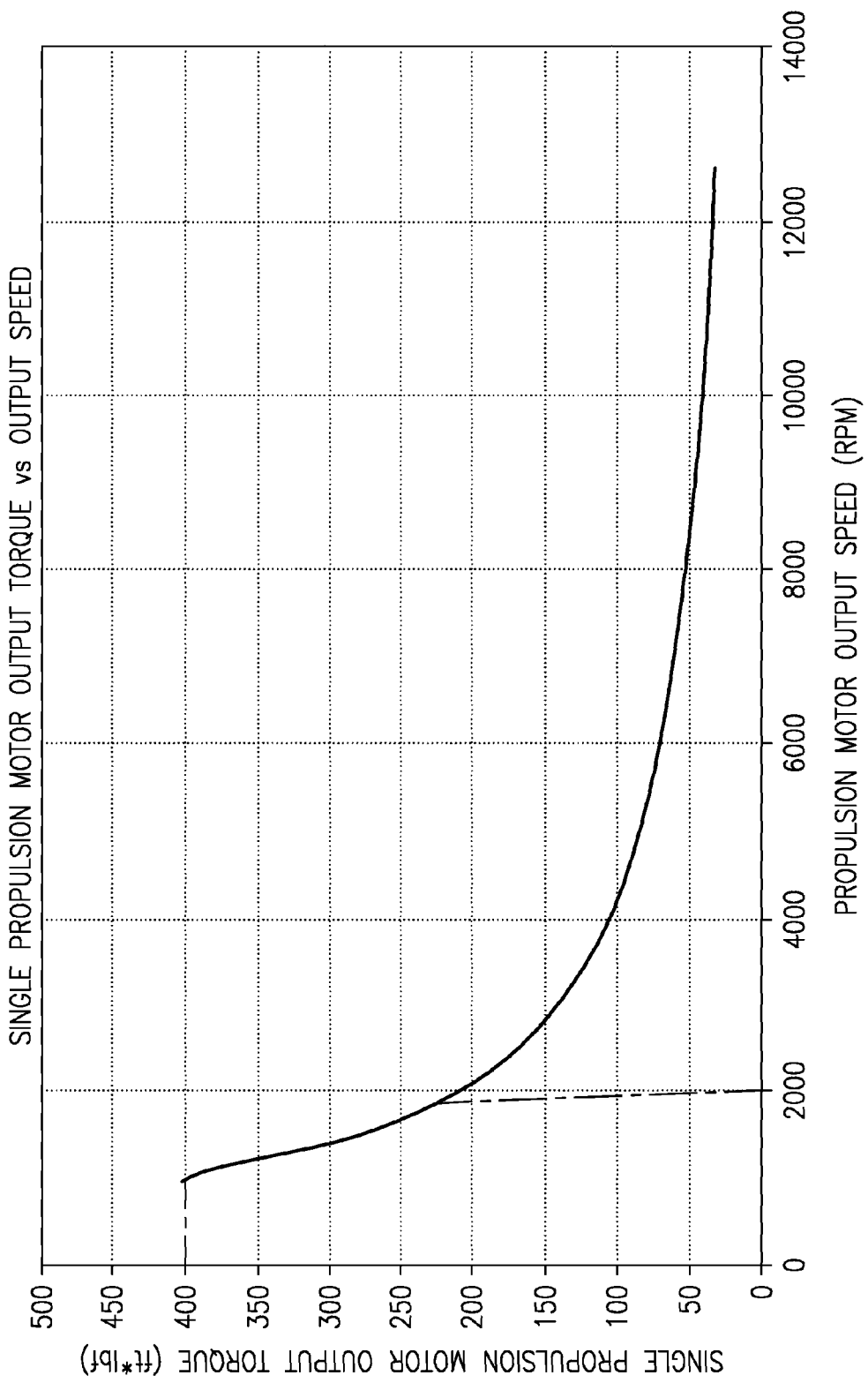
FIG. 3A is a graphical representation of output torque vs. output speed for a dynamoelectric machine in a Stall Condition Low Speed mode.

Referring to FIG. 2A, at zero rotational speed, the flux throttle system 40 is in a full outboard position which allows for maximum motor torque. As the rotor speed increases, lubricating oil introduced into the rotor shaft 26 hydraulic pressure is increased within the piston chambers 56A, 56B. The increased pressure forces the respective pistons 58A, 58B to extend which compresses the return spring 60A, 60B to begin to drive the first ring 42A and the second ring 42B in an inboard direction. Note the motor performance curve (FIG. 3A) as the first ring 42A and the second ring 42B are axially displaced from the plurality of stator poles 30 and the plurality of permanent rotor magnets 36. In this state, the motor is capable of producing high torque (400 ft*lbf), but only up to a speed of 2000 rpm.

Medium Speed-Low End

Figure 3B:
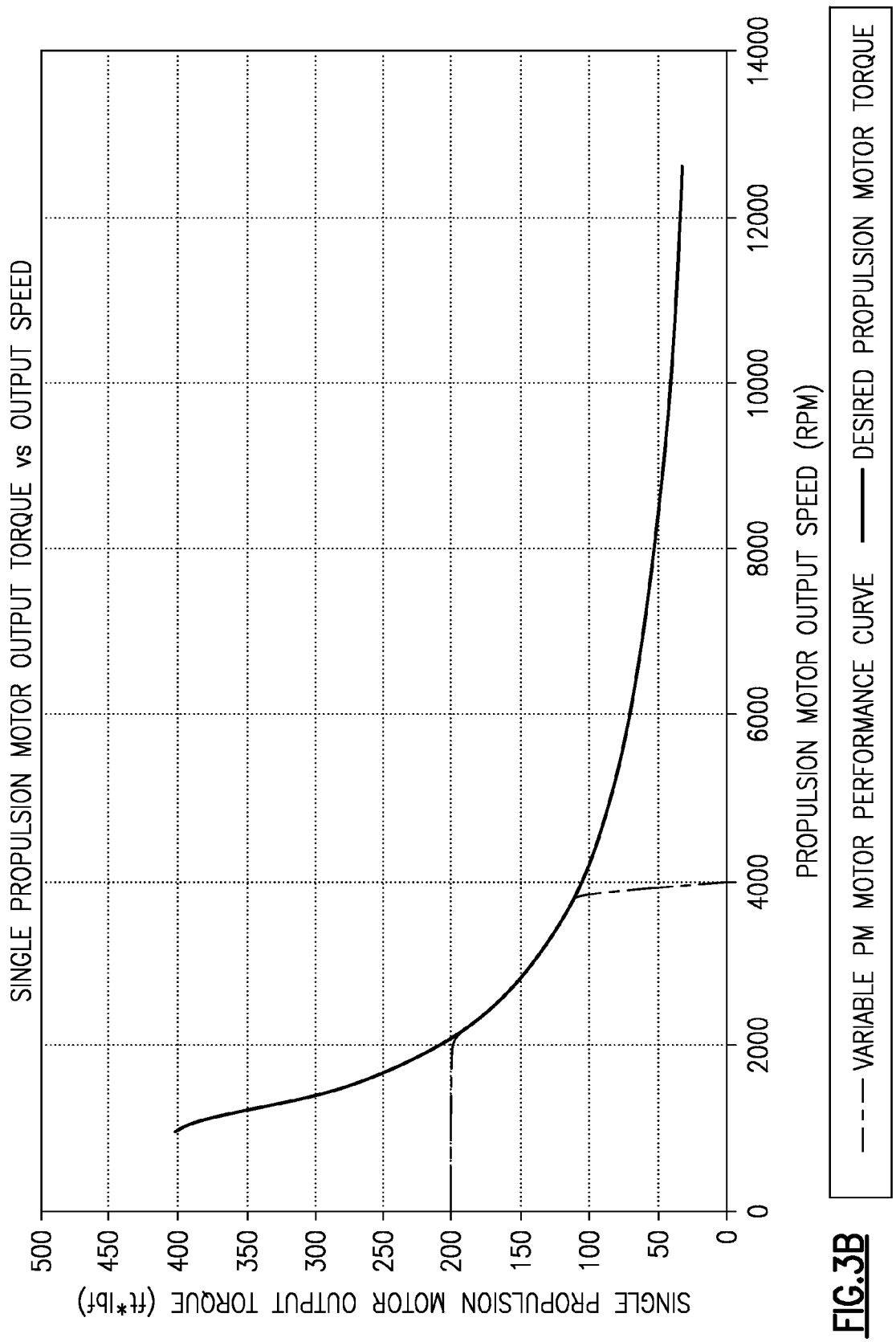
FIG. 3B is a graphical representation of output torque vs. output speed for a dynamoelectric machine in a Medium Speed-Low End mode.

As the rotor assembly 32 accelerates, the rotational gravity field increases, which causes the hydraulic pressure to increase within the piston chambers 56A, 56B. The increased pressure forces the respective pistons 58A, 58B to extend and drive the first ring 42A and the second ring 42B inboard. The first ring 42A and the second ring 42B are axially inserted between the plurality of stator poles 30 and the plurality of permanent rotor magnets 36 to further reduce the effective stack length. The motor performance curve is thereby modified (FIG. 3B).

Medium Speed-High End

Figure 3C:
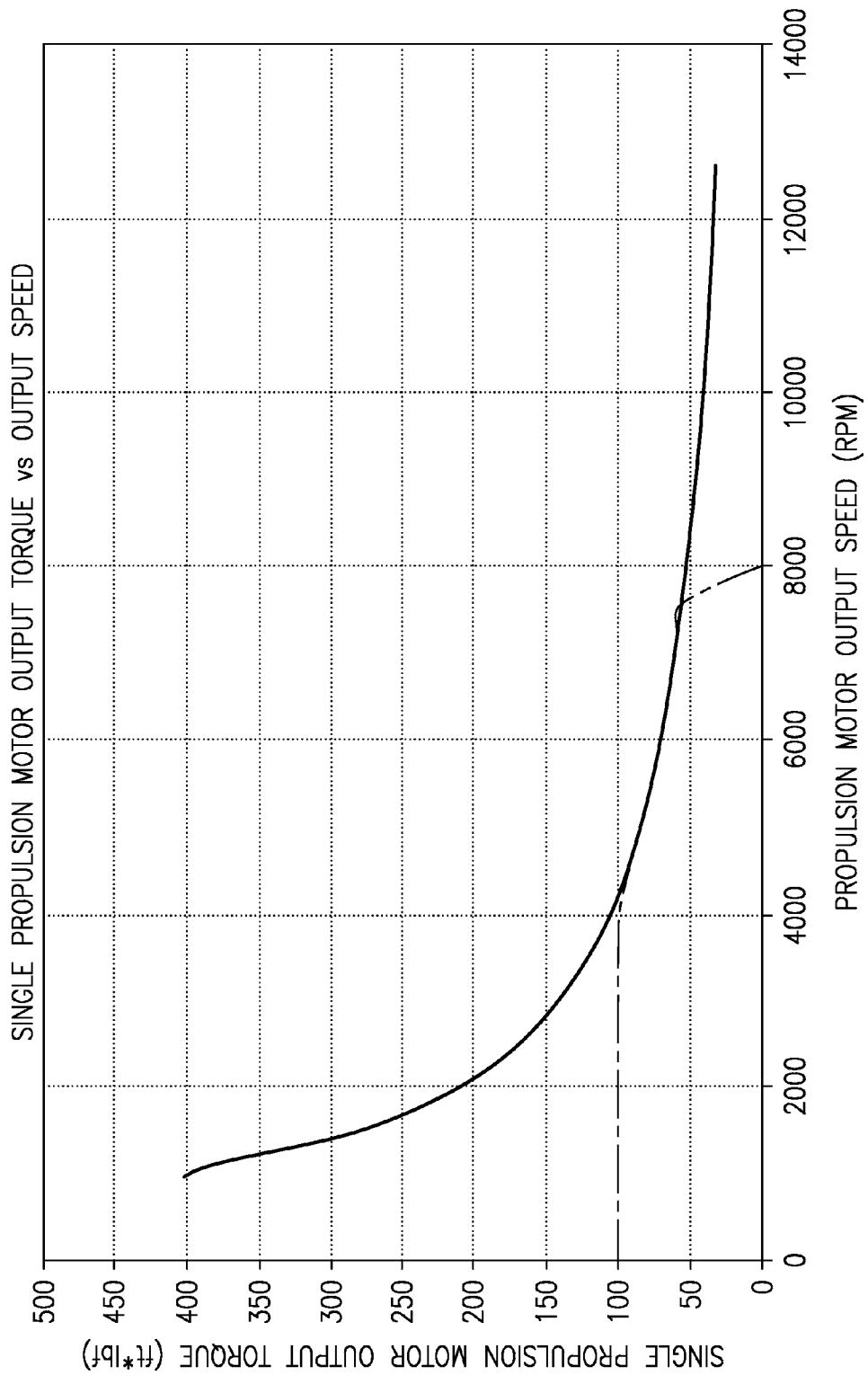
FIG. 3C is a graphical representation of output torque vs. output speed for a dynamoelectric machine in a Medium Speed-High End mode.

As the rotor assembly 32 continues to accelerate, the flux throttle system 40 continues to be axially inserted between the plurality of stator poles 30 and the plurality of permanent rotor magnets 36 to still further reduce the effective stack length and further modify the motor performance curve (FIG. 3C).

High Speed

Figure 3D:
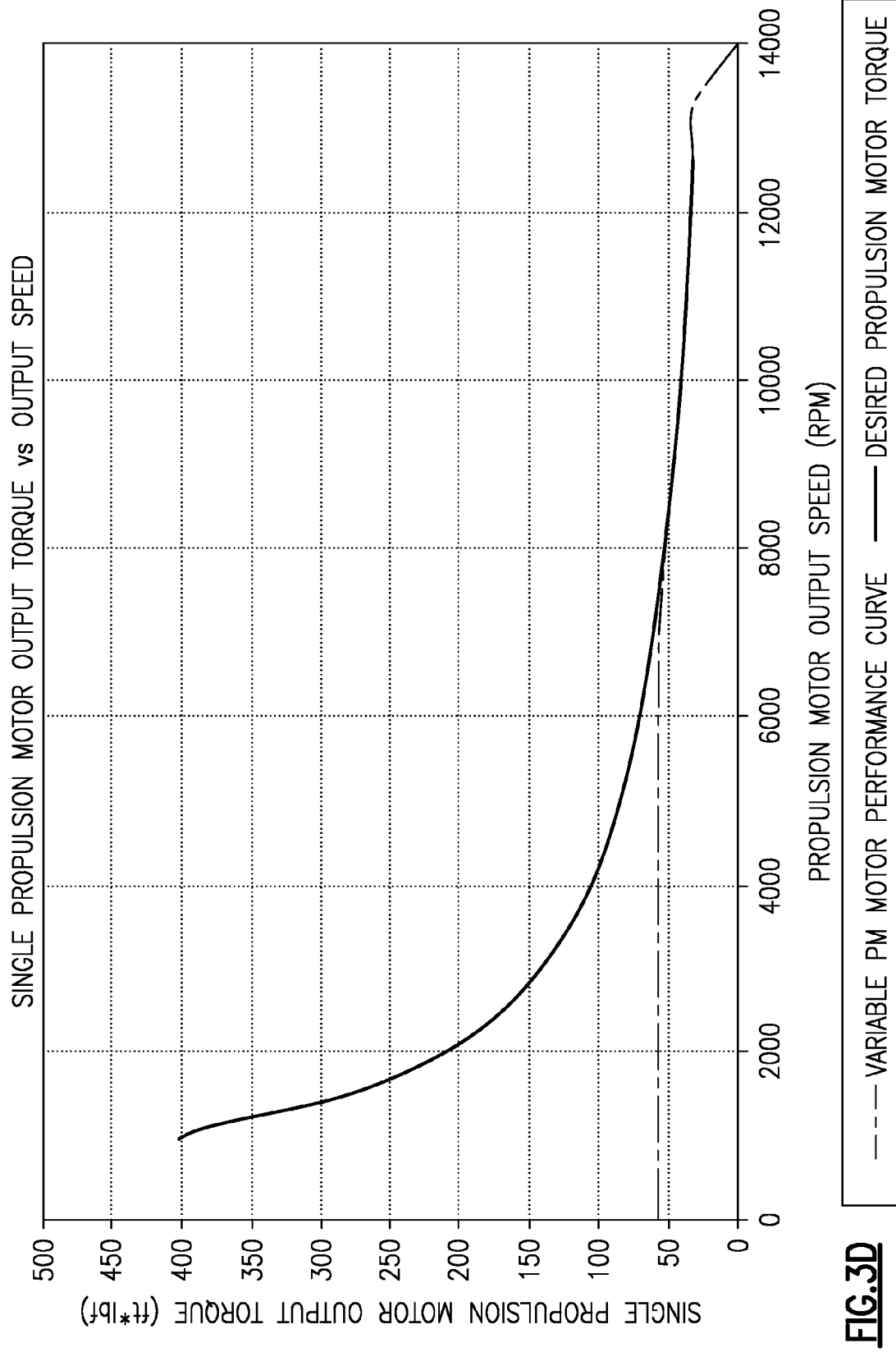
FIG. 3D is a graphical representation of output torque vs. output speed for a dynamoelectric machine in a High speed End mode.

At full speed, for example 12.500 rpm, the flux throttle system 40 is fully inserted between the plurality of stator poles 30 and the plurality of permanent rotor magnets 36 to still further reduce the effective stack length and modify the motor performance curve (FIG. 3D).

The flux throttle system 40 provides for high speed with low torque in which the permanent magnet type dynamoelectric machine 20 may operate in a constant power mode, instead of a constant torque mode. It should be understood that the flux throttle system 40 may be moved in discrete steps or in a smooth uniform fashion.

Figure 4:
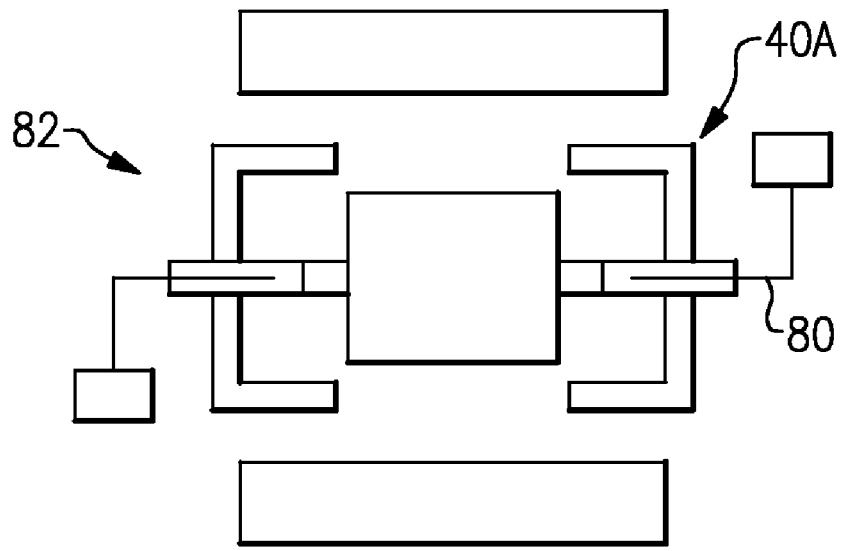
FIG. 4 is a schematic view of another dynamoelectric machine with a passively controlled flux throttle.

Although the disclosed non-limiting embodiment utilizes rotational speed to passively increase the hydraulic pressure and position the flux throttle system 40A, another non-limiting embodiment includes a mechanical linkage system 80 (illustrated schematically; FIG. 4) such as a set of fly-weights and linkages to actuate a flux throttle system 82 relative the rotational speed. Other mechanical linkages systems, for example, a bearing and a clutch linkage may be operated with an active or passive control system. The flux throttle system 40A may alternatively or additionally be actuated with an external actuator via a bearing and actuator arm such as a throwout bearing in a clutch system. The actuator may be, for example only, linear, rotary, hydraulic, ball screw, etc.

Figure 5:
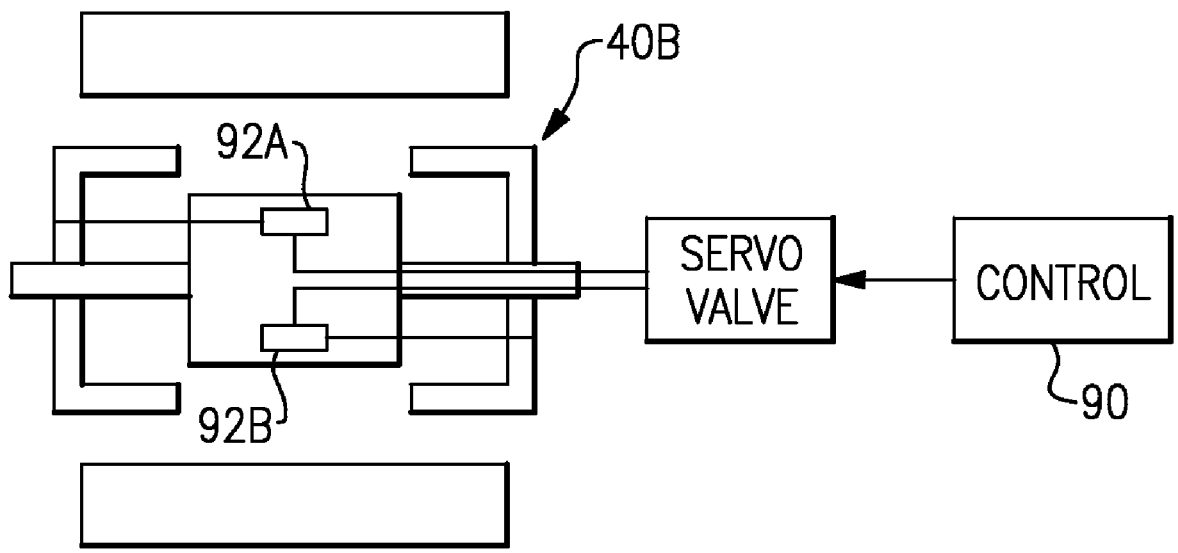
FIG. 5 is a schematic view of another dynamoelectric machine with an actively controlled flux throttle.

Referring to FIG. 5, another non-limiting embodiment includes an active control system 90 (illustrated schematically) such as a servo-valve may alternatively or additionally be provided to provide the motive force necessary to actuate the flux throttle system 40B. The active control system 90 regulates the pressure of the fluid within the hydraulic pistons 92A, 92B to actively change the output voltage of the electric machine independent of the operating speed.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A dynamoelectric machine comprising:
   a stator assembly;
   a rotor assembly mounted for rotation relative to said stator assembly about an axis of rotation; and
   a flux throttle system selectively positionable between said stator assembly and said rotor assembly, said flux throttle system includes a first ring and a second ring; and
   a first and second piston chamber formed within said rotor assembly, said first and second piston chamber support a respective first and second piston which axially position said first ring and said second ring relative said stator assembly and said rotor assembly.

2. The dynamoelectric machine as recited in claim 1, wherein said first ring and said second ring rotate with said rotor assembly.

3. The dynamoelectric machine as recited in claim 1, wherein said first ring and said second ring are axially positionable relative said stator assembly and said rotor assembly.

4. The dynamoelectric machine as recited in claim 1, wherein said first and second piston chamber are arranged generally parallel to said axis of rotation.

5. The dynamoelectric machine as recited in claim 4, further comprising a lubrication system which supplies a lubricant to said first and second piston chamber to drive said first and second piston in response to a rotational speed of said rotor assembly.

6. The dynamoelectric machine as recited in claim 1, further comprising a first and second return spring mounted within said rotor assembly, said first and second return spring axially bias said first ring and said second ring relative said stator assembly and said rotor assembly.

7. The dynamoelectric machine as recited in claim 6, wherein said first and second return spring axially bias said first ring and said second ring in an axial outboard direction.

8. The dynamoelectric machine as recited in claim 1, further comprising:
   a first and second return spring mounted within said rotor assembly, said first and second return spring axially bias said first ring and said second ring relative said stator assembly and said rotor assembly, said first and second return spring axially bias said first ring and said second ring in an axial outboard direction.

9. The dynamoelectric machine as recited in claim 1, wherein said first and second return spring axially bias said first ring and said second ring in an axial outboard direction.

10. The dynamoelectric machine as recited in claim 1, wherein said flux throttle system is actively positioned relative said stator assembly and said rotor assembly.

11. The dynamoelectric machine as recited in claim 1, wherein said flux throttle system is passively positioned relative said stator assembly and said rotor assembly.

12. A dynamoelectric machine comprising:
    a stator assembly;
    a rotor assembly mounted relative to said stator assembly for rotation about an axis of rotation; and
    a flux throttle system includes a first ring and a second ring;
    a first and second piston which axially drives said first ring and said second ring axially outboard relative said stator assembly and said rotor assembly in response to a rotational speed of said rotor assembly; and
    a first and second return spring mounted within said rotor assembly, said first and second return spring operable to axially bias said first ring and said second ring.

13. The dynamoelectric machine as recited in claim 12, wherein said flux throttle system is actively positioned relative said stator assembly and said rotor assembly.

14. The dynamoelectric machine as recited in claim 12, wherein said flux throttle system is passively positioned relative said stator assembly and said rotor assembly.

15. A method of operating a dynamoelectric machine in a constant power mode comprising:
    axially positioning a first and second piston to axially drive a first ring and a second ring axially outboard relative a stator assembly and a rotor assembly in response to a rotational speed of the rotor assembly.

16. A method as recited in claim 15, further comprising:
    axially positioning a first ring and a second ring between the stator assembly and the rotor assembly.

17. A method as recited in claim 15, further comprising:
    electrically removing portions of the rotor assembly.

18. A method as recited in claim 15, further comprising:
    axially biasing the first ring and the second ring axially inboard.

* * * * *